(12) United States Patent
Patoskie

(10) Patent No.: US 9,094,813 B2
(45) Date of Patent: Jul. 28, 2015

(54) SYSTEM AND METHOD FOR REDIRECTING CONTENT BASED ON GESTURES

(75) Inventor: John Patoskie, Allen, TX (US)

(73) Assignee: Open Invention Network, LLC, Durham, NC (US)

(*) Notice: Subject to any disclaimer, the term of this patent is extended or adjusted under 35 U.S.C. 154(b) by 918 days.

(21) Appl. No.: 13/078,938

(22) Filed: Apr. 2, 2011

(65) Prior Publication Data

US 2012/0254463 A1   Oct. 4, 2012

(51) Int. Cl.
  G06F 15/173   (2006.01)
  H04W 4/20    (2009.01)
  G06F 1/16    (2006.01)
  G06F 3/01    (2006.01)

(52) U.S. Cl.
  CPC .......... *H04W 4/206* (2013.01); *G06F 1/1694* (2013.01); *G06F 3/013* (2013.01); *G06F 3/017* (2013.01); *G06F 2200/1637* (2013.01)

(58) Field of Classification Search
  CPC ................................ G06F 3/013; G06F 3/017
  See application file for complete search history.

(56) References Cited

U.S. PATENT DOCUMENTS

| | | | |
|---|---|---|---|
| 7,173,604 B2* | 2/2007 | Marvit et al. ................ | 345/156 |
| 8,014,567 B2* | 9/2011 | Yoon et al. ................... | 382/103 |
| 8,112,719 B2* | 2/2012 | Hsu et al. ..................... | 715/810 |
| 8,150,384 B2* | 4/2012 | Abifaker et al. .............. | 455/418 |
| 8,194,921 B2* | 6/2012 | Kongqiao et al. ............ | 382/103 |
| 8,325,978 B2* | 12/2012 | Chai et al. ................... | 382/103 |
| 8,526,675 B2* | 9/2013 | Ruan ............................ | 382/103 |
| 8,542,320 B2* | 9/2013 | Berestov et al. ............ | 348/552 |
| 8,582,037 B2* | 11/2013 | Stern et al. .................. | 348/734 |
| 8,593,576 B2* | 11/2013 | Friedman .................... | 348/734 |
| 8,665,075 B2* | 3/2014 | Pratt et al. ................. | 340/12.28 |
| 8,692,764 B2* | 4/2014 | Marvit et al. ................ | 345/156 |
| 8,717,318 B2* | 5/2014 | Anderson et al. ............ | 345/173 |
| 8,750,573 B2* | 6/2014 | Ming-Chang et al. ....... | 382/107 |
| 8,831,794 B2* | 9/2014 | Persaud et al. ................. | 701/2 |
| 8,854,557 B2* | 10/2014 | Friedman .................... | 348/734 |
| 8,873,841 B2* | 10/2014 | Yang et al. .................. | 382/159 |
| 2008/0178126 A1* | 7/2008 | Beeck et al. ................ | 715/863 |
| 2009/0024943 A1* | 1/2009 | Adler et al. ................. | 715/764 |
| 2010/0083189 A1* | 4/2010 | Arlein et al. ................ | 715/863 |
| 2011/0088002 A1* | 4/2011 | Freer ............................ | 715/863 |
| 2011/0161890 A1* | 6/2011 | Anderson et al. ............ | 715/863 |
| 2012/0198353 A1* | 8/2012 | Lee et al. .................... | 715/748 |

* cited by examiner

*Primary Examiner* — Michael Y Won
(74) *Attorney, Agent, or Firm* — Haynes and Boone, LLP

(57) ABSTRACT

Content such as advertisements received into a mobile device may be more appropriately displayed on an alternative device remote from the mobile device. When ad content is received into the mobile device, the user may perform a physical gesture such as movement of the device or an associated motion sensor. The physical gesture is analyzed in the mobile device and causes the ad content to be redirected to the remote device. Additional physical gestures by the user can be interpreted in the mobile device to manipulate the content on the remote device.

18 Claims, 5 Drawing Sheets

… (US 9,094,813 B2)

SYSTEM AND METHOD FOR REDIRECTING CONTENT BASED ON GESTURES

FIELD OF THE INVENTION

This disclosure relates to the provision of content to mobile devices and in particular to systems and methods for redirecting content.

BACKGROUND OF THE INVENTION

Mobile device capabilities have grown dramatically in modern times. There is now a vast variety of content that can be presented on mobile devices, including web content. Part of this content may include unsolicited or associated content such as ads, surveys, etc. A consumer may be interested in viewing/listening to one or more ads but the details of the image, background information, or audio on the product or services may be inappropriate for display on the mobile device, for example due to the device's capabilities such as screen resolution, audio quality, text size, etc.

What is required is an improved system and method for displaying content based on user commands and/or preferences.

SUMMARY OF THE INVENTION

Content such as advertisements received into a mobile device may be more appropriately displayed on an alternative device remote from the mobile device. When ad content is received into the mobile device, the user may perform a physical gesture such as movement of the device or an associated motion sensor. The physical gesture is analyzed in the mobile device and causes the ad content to be redirected to the remote device. Additional physical gestures by the user can be interpreted in the mobile device to manipulate the content on the remote device.

In one aspect of the disclosure, there may be provided a method for redirecting content received into a mobile device. When content is received into the mobile device, a user gesture may be detected by a gesture recording device associated with the mobile device. The user gesture may be processed to determine a redirection instruction that can be used to redirect the content to a remote device.

In one aspect of the disclosure, there is provided a method for manipulating content such as advertisements on a mobile device. When content is received into the mobile device, a first physical gesture may be interpreted to redirect the content to a remote device and one or more second physical gestures may be interpreted in the mobile device to manipulate the content on the remote device.

In one aspect of the disclosure, there is provided a mobile device configured for communications with a data network and to receive content from the data network. The mobile device may comprise at least one motion sensor and an application executable on at least one processor of the mobile device. The application may be configured to detect a user gesture, determine a redirection preference from the user gesture, and redirect the content to at least one external device dependent on the redirection preference.

BRIEF DESCRIPTION OF THE DRAWINGS

Reference will now be made, by way of example only, to specific embodiments and to the accompanying drawings in which.

DETAILED DESCRIPTION OF THE INVENTION

In the Applicant's co-pending application Ser. No. 13/078, 935, the entire contents of which are incorporated herein by reference, there is described a gesture based filtering system and method that can be used to filter the types of content a user might prefer to see. The present disclosure is directed toward utilizing available (external) resources to improve the experience with the content.

Figure 1:
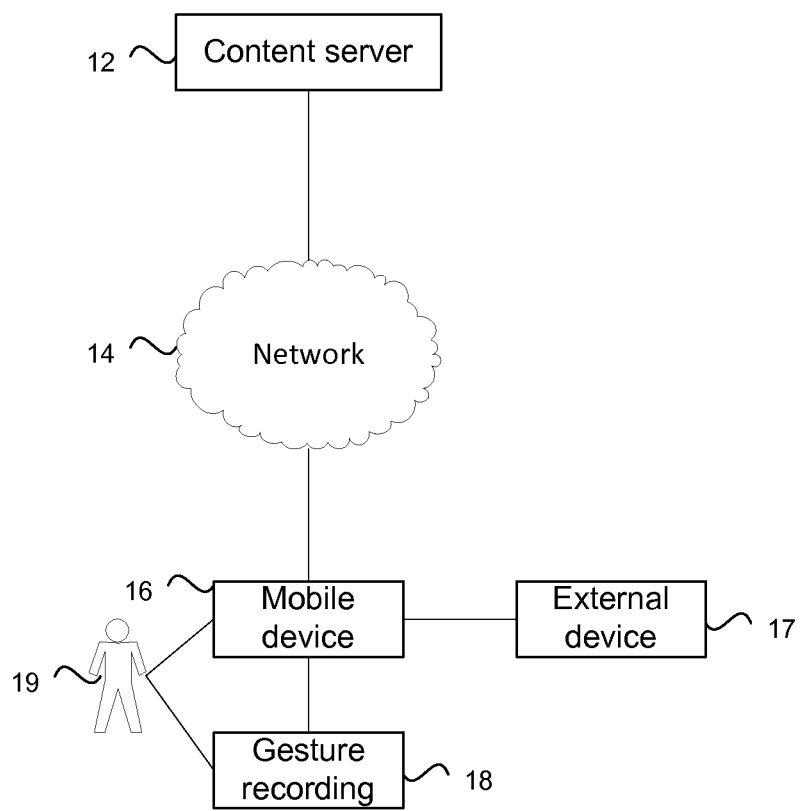
FIG. 1 depicts a mobile communications system.

In FIG. 1, there is shown a system 10 on which the gesture-preferences based methods may be implemented. The system 10 includes a content server 12, such as an ad server, that provides content through a network 14 to users 19 at one or more mobile devices 16. Various content types are contemplated including, without limitation, ad content, streaming video or audio, etc. The mobile device 16 may be a network enabled device configured to receive the content, such as a mobile phone, smartphone or similarly web-enabled device. The mobile device 16 may also be tablet computer, netbook or similar mobile computing device. The mobile device is operated by a user 19 and may be associated with one or more other external or remote devices 17 of the user 19. Examples of the external devices include, without limitation, television, home computer, portable computer, sound system, entertainment system, in store projector/display, and similar audio and video devices. The remote device(s) may communicate with the mobile device via suitable protocols, such as short range protocols, e.g. Bluetooth, infra-red protocols, etc. Alternatively, both the mobile device 16 and remote device(s) 17 may be connected to a network so that the devices can communicate using IP protocols or similar. Remote devices may include devices under control of the user and/or devices under control of the content provider and/or devices under the control of third parties, such as store owners. In one embodiment, the remote displays may include one or more displays in stores, airports, malls, etc. A vehicle may also provide alternative resources to use. Also provided may be a gesture recording device 18. The gesture recording device 18 may be integrated with the mobile device 16, such as an accelerometer or similar motion sensor. Alternatively or in addition, the motion sensor 18 may be a non-integrated device that is locally paired with the mobile device 18, e.g. via a short-range communications protocol such as Bluetooth. Non-integrated motion sensors may include accelerometers, gyroscopes, or devices for measuring eye movements.

Tracking of eye movement could occur using sensors in the glasses worn by a user while viewing information and communicated back to the mobile device. For example, a pair of sun glasses which can track eye movement can communicate such movement to a mobile device using Bluetooth technology. When a user is presented content, the user's eye movements could register the gesture to redirect content or the act of viewing a nearby device could indicate redirection.

The content server 12 provides content to the mobile device 16 via the network 14 in a known and conventional manner.

At times, the user may decide that content provided to the mobile device 16, such as an ad, is best conveyed on a different type of remote device (e.g. display device or audio device)

depending on the ad's message medium. As will be described in greater detail below, the mobile device 16 may execute an application that enables a user 19 to provide a gesture on the mobile device 16 or associated gesture sensor 18 to provide a redirection of the ad content.

Figure 2:
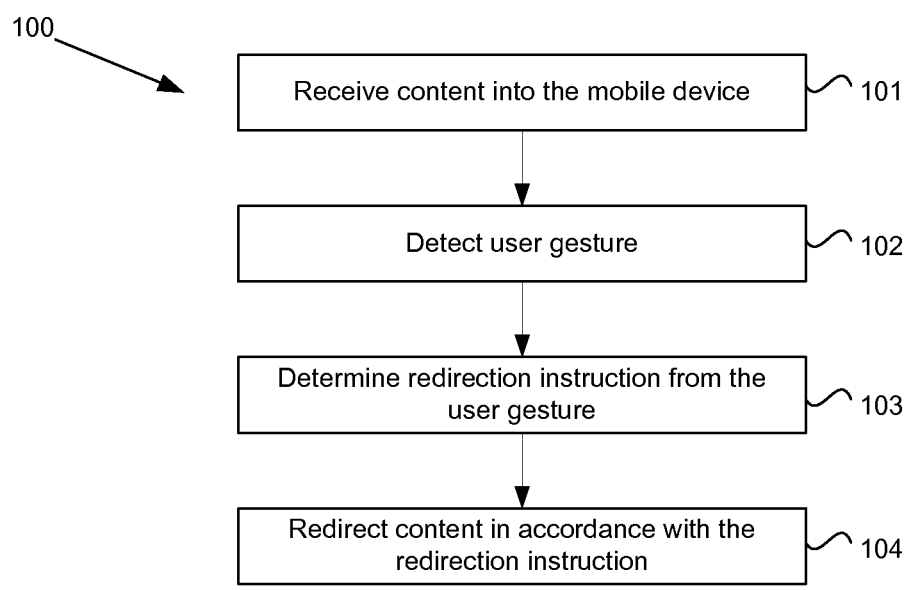
FIG. 2 depicts a process for redirecting content to a mobile device.

A process for redirecting the content is depicted in the flowchart 100 of FIG. 2. At step 101, the content is received into the mobile device 16 from the content server 12 via the network 14. The content may be presented, wholly or in part, to the user 19 to enable the user to indicate a gesture with the gesture device 18 (step 102). A detected gesture is processed to determine a redirection instruction associated with the user gesture (step 103), thereby enabling the content to be redirected in accordance with the redirection instruction (step 104).

In one embodiment, the gesture may be used to redirect the immediate content. For example, the user may receive the content on their mobile device and decide to "throw" it to another device. Alternatively or in addition, the gesture may be used to set preferences on their mobile device as described in the Applicant's co-pending patent application Ser. No. 13/078,935 referenced above, so that content matching the preference criteria are displayed/played on a remote device automatically.

In one embodiment, the redirection request to transfer content to a remote device could also indicate to the originator of the content to show a better quality version of the content based on the new capabilities of the remote device vs. the mobile device. Once received on the remote device, the content can be manipulated from the mobile device to scroll forward or back, enlarge/reduce, increase volume, etc. through gestures on the mobile device.

Figure 3:
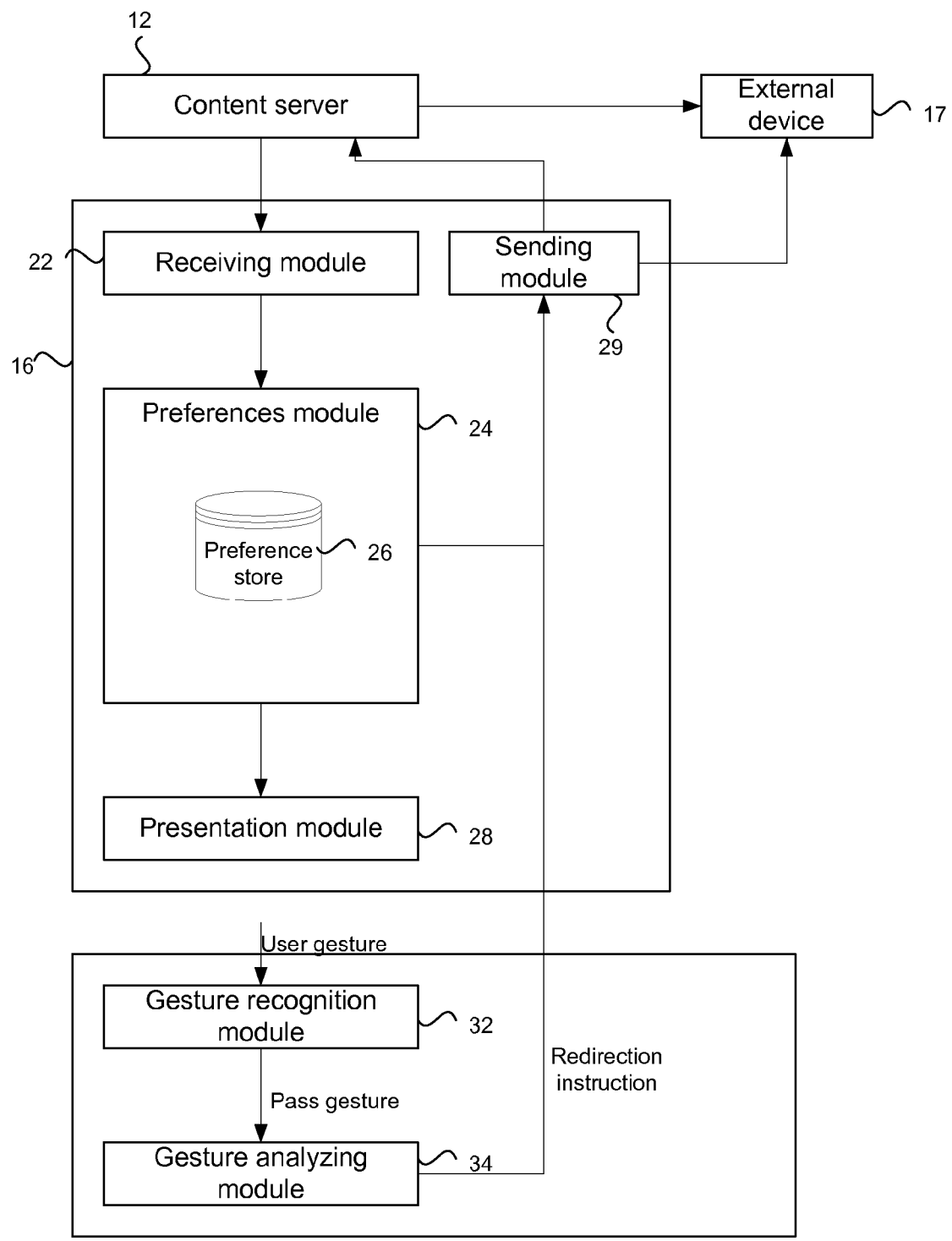
FIG. 3 depicts a mobile device configured to perform gesture-based redirections.

The mobile device 16 is shown in more detail in FIG. 3. The mobile device 16 includes a receiving module 22 that initially receives the content from the content server 12.

The receiving module passes the content to a preference module 24. The preferences module 24 may also include a preferences datastore 26 that stores content related preferences, as will be described in more detail below. Based on any set preferences for the received content, the preferences module passes the content to a presentation module 28 that presents the content to the user 19, e.g. via a screen display of the mobile device or by audio through the speakers of the mobile device 16.

When the content is presented, the user may invoke an application to provide a gesture in relation to the content. When the user makes a physical gesture, such as movement of the mobile device 16, the gesture is detected by a gesture recognition module 32 and passed to a gesture analyzing module 34. The gesture may be interpreted as a redirection instruction. The redirection instruction is providing to a sending module 29. The redirection instruction may be interpreted by the sending module 29 to cause the sending module 29 to send the content to an external device 17. The content may be transmitted to the external device by any suitable protocol, for example via short range protocols such as Bluetooth, WiFi, infrared, peer-to-peer protocols, etc.

In an alternative embodiment, the sending module may send the redirection instruction to the content server 12 so that the content server 12 performs the redirection of the content to the external device 17.

Figure 4:
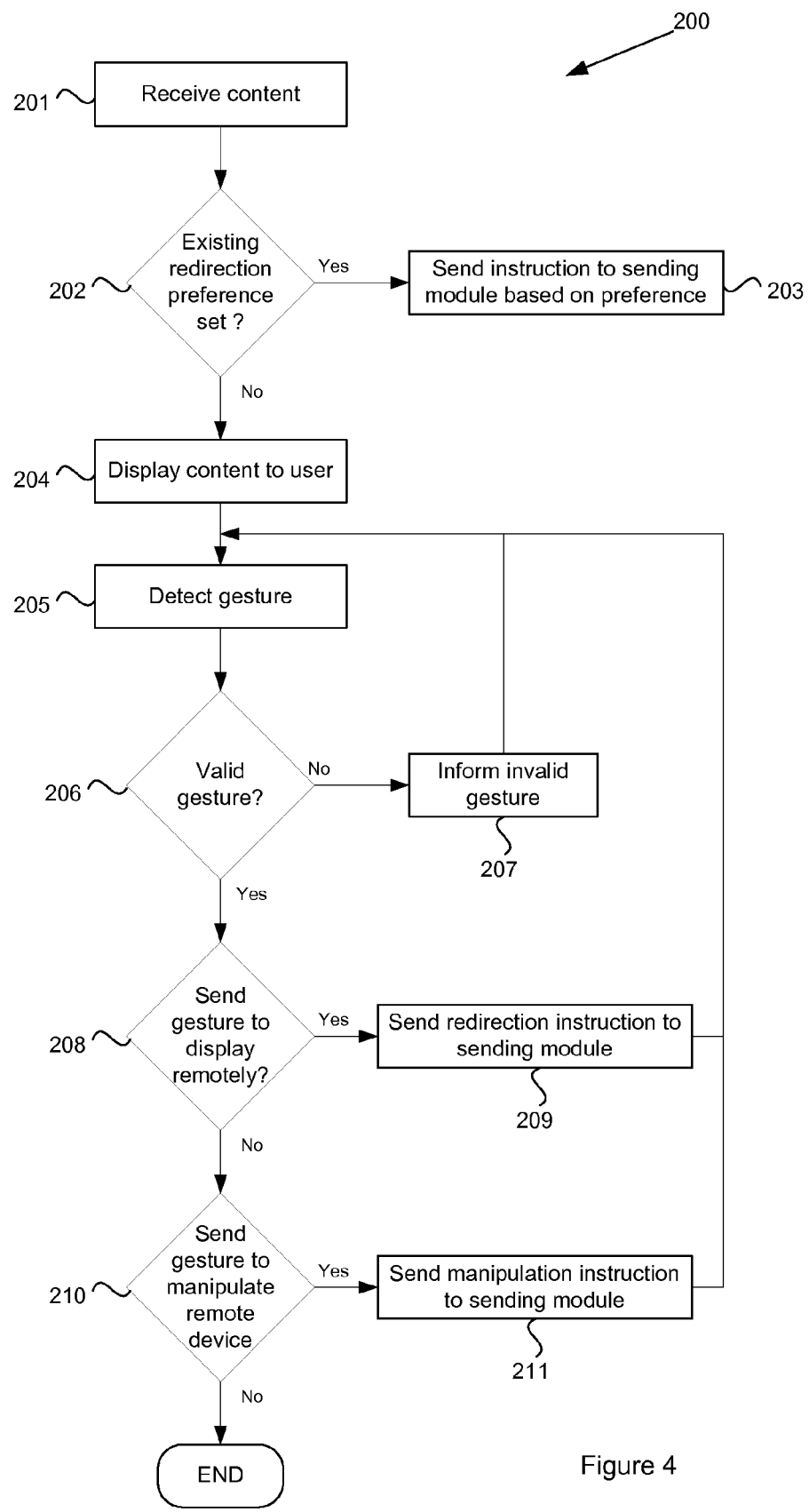
FIG. 4 depicts a process for redirecting content.

An example of the process for redirecting the content is depicted in the flowchart 200 of FIG. 4. The mobile device 16 receives the content at step 201 and passes the content to the preferences module 24. At step 202, the preferences module 24 determines whether any existing preferences are set for the content by parsing the content to determine the content parameters and then using the content parameters as a lookup to the preferences datastore 26. If preferences have been set for the content, then a redirection instruction based on the preferences is sent to the sending module 29 (step 203). If no preferences are set, then the content is passed to the presentation module 28 for presentation to the user 204.

The user may invoke a gesture recording process in respect of the content. In the gesture recording process, the user performs a gesture, such as moving the mobile device, which is detected by the gesture recognition module 32 (step 205). The gesture recognition module 32 determines whether the gesture is a valid gesture (determination 206). If the gesture is invalid, the user is informed 207 and the process may return to step 205. Otherwise, if the gesture is valid, the gesture analyzing module 34 determines whether the gesture relates to a redirection (step 208). If so, a redirection instruction is conveyed from the gesture analyzing module 34 to the sending module (step 209), which then redirects the content in accordance with the redirection instruction. If at step 208, the gesture is not correlated with a redirection instruction, then the gesture analyzing module determines if the gesture is correlated with a manipulation instruction (step 210). If so, then the gesture analyzing module conveys a manipulation instruction to the sending module 211. After sending of the redirection or manipulation instructions (steps 209, 211), the process returns to step 205 to await further gestures.

As described above, the preferences module 24 may be used to perform any pre-set filtering or manipulation of the content prior to presenting the content to the user. Content preferences may be stored in a preference datastore 26. The preference datastore 26 may be an integrated memory of the mobile device 16, as shown in FIG. 3. Alternatively, the preference datastore may be an off-device datastore accessed via the network 14 (FIG. 1). The preference datastore 26 uses the content parameters as a lookup to determine whether any preferences exist for those content parameters. In one embodiment, content received into the mobile device may be automatically redirected to the remote device and/or formatted and/or manipulated based on a pre-set preference for the content without presenting the content to the user on the mobile device.

Figure 5:
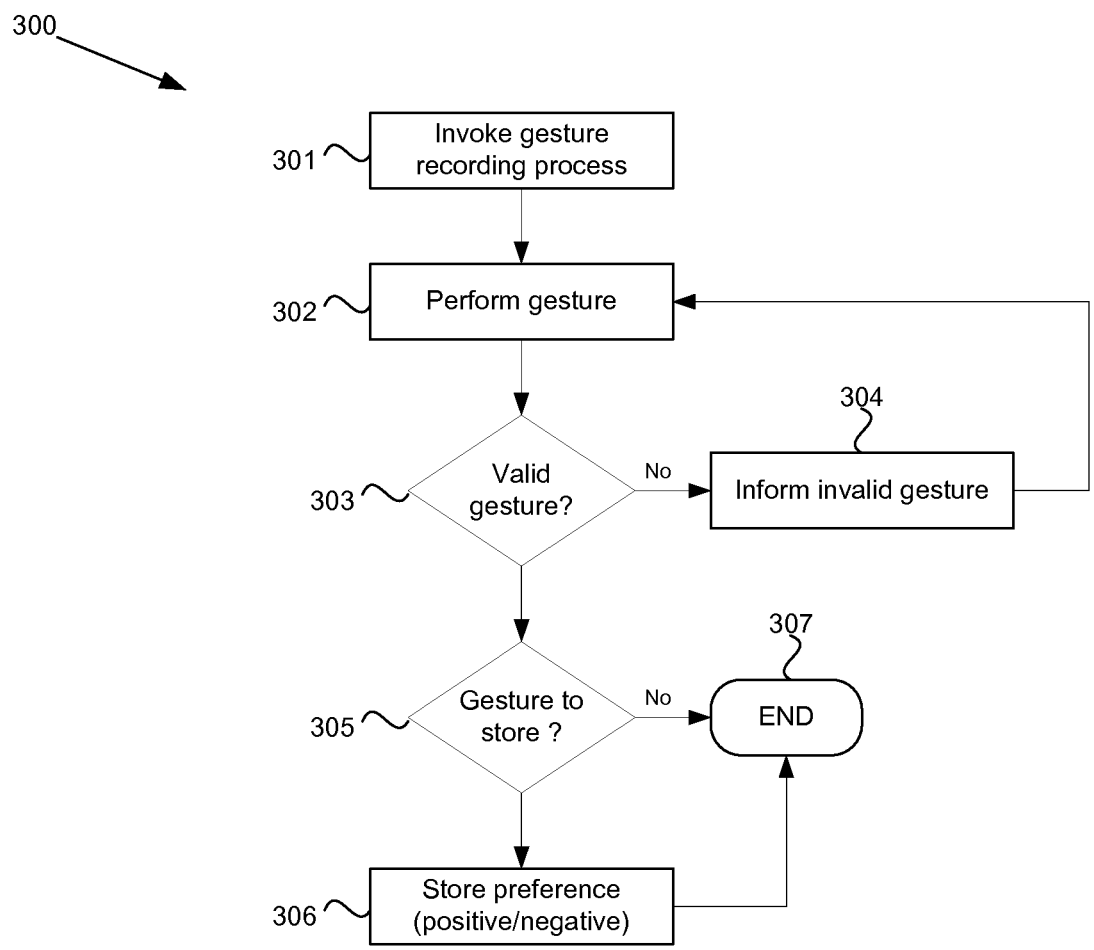
FIG. 5 depicts a process for recording gesture based preferences.

The user may set preferences through an application interface. The interface may be menu and/or key driven. In one embodiment, preferences may be set by recording gestures. An example of a gesture-based preference recording process is depicted in the flowchart 300 of FIG. 5. When the user is presented with the content, the user may invoke the preference recording process in order to record a gesture or preference for the content. After invoking the gesture process (step 301), the user performs a gesture (step 302) which is detected by the gesture recognition module 32. If the gesture is not valid (determination 303), the user is informed 304 and allowed to re-perform the gesture. If the gesture is valid, the gesture is passed to a gesture analyzing module 34 which prompts the user to indicate whether the gesture indicates a preference or an action to perform on the content, for example whether the gesture indicates a redirection instruction.

The preference for the content is then stored in the preference datastore 26 (step 306) so that this preference may be applied to subsequent content and then the process terminates 307.

The gesture recognition module 32 may be built into the mobile device 16. The gesture is initiated by a command (either a button push or a vocal command). In one embodiment, the gesture itself (after initiated) is a movement of the device that may be recorded by the gesture recognition module 32. The gesture recognition module 32 may include a motion sensor, such as an accelerometer, digital compass, etc., as well as processing circuitry for interpreting the output of the motion sensor as a gesture. A wide variety of simple and complex gestures are contemplated. In one embodiment, gestures could include a slow shaking, rapid shaking, long movement (one direction), short movement, fast movement, slow movement etc. More complex gestures could include that a left to right horizontal movement toward a remote device while either holding down a button or preselecting the button could indicate redirection. While pointing at the remote device, a movement over a slope up and right could indicate resize/zoom the image. A clockwise circular motion could indicate an increase in volume on the remote device, while a counterclockwise circular motion could indicate lower the volume. Other types of gestures and actions that could be associated with those gestures will be apparent to a person skilled in the art and all such gestures are intended to be encompassed herein.

The gesture recognition module 32 determines if a gesture has occurred. This includes detecting some motion and assigning properties to the motion or action. These properties may include direction, time, distance and angle. Once the properties have been determined, the properties are passed from the gesture recognition module 32 to the gesture analyzing module 34. The gesture analyzing module 34 takes a set of properties related to a gesture and determines if they correspond to a valid gesture on record. E.g. the movement corresponds to a request to rewind content back XX seconds.

An initial configuration is required to associate gestures to activities. Defaults are given, but the user can modify through an interface on the mobile device. E.g. some gestures may be different depending on the user's hand preference (left handed vs. right handed).

In one embodiment, the motion sensor may be a separate device that is locally paired with the mobile device 16, e.g. via Bluetooth or some similar communication protocol, that enables the output of the motion sensor to be analyzed by the gesture analyzing module 34. In one embodiment, the locally paired device may be a device for measuring eye movements as described above. While a gesture can be the movement of the mobile device, the gesture could also be the amount of time a user's eyes remain on the particular components of the content.

The gesture is communicated from the gesture recognition module 32 to the gesture analyzing module 34. The gesture analyzing module 34 receives the gesture and determines whether the gesture indicates a redirection instruction and/or a manipulation instruction.

Redirection preferences may include a remote device to redirect the content to. Additional redirection preferences may include formatting instructions, such as a request to reformat the content for the display of the content on the remote device. Additional formatting instructions include color vs. black and white, color depth, resolution (720p, 1080p), widescreen vs. 4:3 formatting, surround sound vs. 5.1 dolby digital, 3D vs. 2D, font size and initial volume setting. The particular redirection that is performed may be based on the particular gesture. For example a first gesture may redirect the content to a first remote device while a second gesture may redirect the content to a different device. In addition, formatting instructions to be included in the redirection instruction may also be gesture dependent. The gesture analyzing module may have a datastore that correlates gestures with particular redirection preferences or actions. Alternatively, the gesture analyzing module may communicate with the preferences module to determine preferences that are associated with a particular gesture.

In addition to redirection instructions, the mobile device 16 and the gesture recording device 18 may be used to manipulate the redirected content on the remote device 17. Content manipulation may include stop, pause, rewind, fast forward, volume up, volume down, zoom in/out, print (assuming a screen image is selected and a printer is available). Most digital display devices accept Infrared commands which can be sent from a mobile device or can accept commands through a USB/HDMI/Serial cable from the content server. If the display device is unable to provide this level of interaction, the content manipulation can occur directly on the content server and then be sent to the remote device.

The embodiments described above allow users of mobile devices to quickly and easily redirect relevant information such as advertising from their mobile device to more appropriate display devices based on simple gestures.

The components of the system 10 may be embodied in hardware, software, firmware or a combination of hardware, software and/or firmware. In a hardware embodiment, the gesture-based redirection application may be executed on a processor of the mobile device. The application may be stored as a set of executable instructions in a memory of the mobile device that is operatively associated with the processor.

Although embodiments of the present invention have been illustrated in the accompanied drawings and described in the foregoing description, it will be understood that the invention is not limited to the embodiments disclosed, but is capable of numerous rearrangements, modifications, and substitutions without departing from the spirit of the invention as set forth and defined by the following claims. For example, the capabilities of the invention can be performed fully and/or partially by one or more of the blocks, modules, processors or memories. Also, these capabilities may be performed in the current manner or in a distributed manner and on, or via, any device able to provide and/or receive information. Further, although depicted in a particular manner, various modules or blocks may be repositioned without departing from the scope of the current invention. Still further, although depicted in a particular manner, a greater or lesser number of modules and connections can be utilized with the present invention in order to accomplish the present invention, to provide additional known features to the present invention, and/or to make the present invention more efficient. Also, the information sent between various modules can be sent between the modules via at least one of a data network, the Internet, an Internet Protocol network, a wireless source, and a wired source and via plurality of protocols.

What is claimed is:

1. A method for redirecting content received into a mobile device, the method comprising:
    receiving the content into the mobile device from a content server;
    detecting a user gesture with at least one gesture recording device associated with the mobile device;
    processing the user gesture to determine a redirection instruction associated with the user gesture;
    providing the redirection instruction to the content server, the redirection instruction indicating to the content server an external device to redirect the content to and to show a better quality version of the content on the remote device; and
    redirecting the content in accordance with the redirection instruction.

2. The method of claim 1 comprising:
    processing the redirection instruction to determine an external device; and
    redirecting the content to the external device.

3. The method of claim 2 comprising:
processing the redirection instruction to determine one or more formatting parameters for the content; and
presenting the content on the external device in accordance with the one or more formatting parameters.

4. The method of claim 2 comprising:
detecting at least one second user gesture with the at least one gesture recording device;
processing the user gesture to determine a manipulation instruction associated with the user gesture; and
providing the manipulation instruction to the external device to cause manipulation of the content on the external device.

5. The method of claim 1 wherein the redirection instruction comprises one more formatting preferences for presenting the redirected content on the external device.

6. The method of claim 1 comprising:
determining one or more content parameters of the content;
associating the redirection instruction with the one or more content parameters; and
storing the association in a gesture preference datastore.

7. The method of claim 6 comprising:
receiving second content into the mobile device;
determining one or more second content parameters of the second content;
providing the one or more second content parameters to the gesture preference datastore to retrieve one or more redirection preferences in respect of the second content;
redirecting the second content in accordance with the retrieved one or more redirection preferences.

8. The method of claim 1 wherein processing the user gesture comprises:
providing the user gesture to a redirection preferences datastore;
retrieving a redirection preference from the datastore;
applying the redirection preference to the content.

9. The method of claim 1 comprising invoking a preference recording application that enables a user to record a gesture-based preference.

10. The method of claim 6 wherein the preference datastore comprises a memory of the mobile device.

11. The method of claim 1 wherein recording a user gesture comprises recording motion of the mobile device.

12. The method of claim 1 wherein recording a user gesture comprises recording motion of a device locally paired with the mobile device.

13. The method of claim 12 wherein recording a user gesture comprises recording eye movement of the user.

14. The method of claim 1 comprising:
detecting a second gesture with the at least one gesture recording device;
manipulating the content on the external device dependent on the second gesture.

15. A mobile device configured for communications with a data network and to receive content from the data network, the mobile device comprising:
at least one motion sensor; and
an application executable on at least one processor of the mobile device, the application configured to:
present content to a user of the mobile device;
detect a redirection gesture;
determine a redirection preference from the us redirection gesture;
redirect the content to at least one external device dependent on the redirection preference;
detect at least one manipulation gesture different to the redirection gesture after the redirect;
process the manipulation gesture to determine a manipulation instruction associated with the manipulation gesture; and
manipulate the content on the external device based on the manipulation gesture.

16. The mobile device of claim 15 comprising a memory for storing a plurality of gesture-based preferences.

17. A method for manipulating ad content on a mobile device, the method comprising:
receiving ad content into the mobile device;
detecting a first physical gesture with the mobile device for redirecting the content;
redirecting the ad content to a remote device in response to the first physical gesture;
detecting at least one second physical gesture for manipulating the content on the remote device with the mobile device after the redirecting; and
manipulating the ad content on the remote device in response to the at least one second physical gesture.

18. The method of claim 17 comprising:
determining a content display control command associated with the at least one second physical gesture; and
communicating the display control command to the remote device.

* * * * *